(12) United States Patent
Mahmud et al.

(10) Patent No.: US 7,681,085 B2
(45) Date of Patent: Mar. 16, 2010

(54) SOFTWARE RELIABILITY ANALYSIS USING ALERTS, ASSERTS AND USER INTERFACE CONTROLS

(75) Inventors: Adnan Azfar Mahmud, Kirkland, WA (US); Yingnong Dang, Beijing (CN); Haidong Zhang, Beijing (CN); Qiang Wang, Beijing (CN); Wenli Zhu, Beijing (CN); Yantao Li, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 11/818,612

(22) Filed: Jun. 15, 2007

(65) Prior Publication Data

US 2008/0313507 A1 Dec. 18, 2008

(51) Int. Cl.
*G06F 11/00* (2006.01)

(52) U.S. Cl. .............................. 714/45; 714/37; 714/38; 714/47

(58) Field of Classification Search ................... 714/26, 714/37, 38, 45, 46, 47, 57; 709/224
See application file for complete search history.

(56) References Cited

U.S. PATENT DOCUMENTS

| | | | |
|---|---|---|---|
| 5,548,718 A | | 8/1996 | Siegel et al. |
| 5,774,660 A * | | 6/1998 | Brendel et al. ............ 709/201 |
| 5,956,720 A * | | 9/1999 | Fernandez et al. ............ 707/10 |
| 6,128,279 A * | | 10/2000 | O'Neil et al. ................ 370/229 |
| 6,138,159 A * | | 10/2000 | Phaal ........................... 709/226 |
| 6,144,962 A * | | 11/2000 | Weinberg et al. ............. 707/10 |
| 6,167,358 A * | | 12/2000 | Othmer et al. ............... 702/188 |
| 6,182,139 B1 * | | 1/2001 | Brendel ....................... 709/226 |
| 6,564,174 B1 * | | 5/2003 | Ding et al. ................... 702/186 |
| 6,587,970 B1 * | | 7/2003 | Wang et al. .................... 714/47 |
| 6,633,782 B1 * | | 10/2003 | Schleiss et al. ................ 700/26 |
| 6,701,363 B1 * | | 3/2004 | Chiu et al. ................... 709/224 |
| 6,748,555 B1 * | | 6/2004 | Teegan et al. ................. 714/38 |
| 6,754,312 B1 * | | 6/2004 | Gundlach ................ 379/32.03 |
| 6,816,898 B1 * | | 11/2004 | Scarpelli et al. ............. 709/224 |
| 6,845,474 B2 * | | 1/2005 | Circenis et al. ............... 714/48 |
| 6,901,347 B1 | | 5/2005 | Murray et al. |
| 7,003,766 B1 | | 2/2006 | Hong |
| 7,028,225 B2 | | 4/2006 | Maso et al. |
| 2004/0191743 A1 | | 9/2004 | Chiu et al. |
| 2004/0230858 A1 | | 11/2004 | Susskind |
| 2005/0021293 A1 | | 1/2005 | Elbel et al. |
| 2005/0071807 A1 | | 3/2005 | Yanavi |

OTHER PUBLICATIONS

Gokhale, et al., "Software Reliability Analysis Incorporating Fault Detection and Debugging Activities."
Nagappan, et al., "Towards a Metric Suite for Early Software Reliability Assessment", Department of Computer Science, North Carolina State University, NC 27695. Date: 2003.
Rosenberg, et al., "Software metrics and reliability".

* cited by examiner

*Primary Examiner*—Joshua A Lohn

(57) ABSTRACT

Described is a technology by which software instrumentation data collected during software program usage sessions is analyzed to identify potential problems with software program usage, such as based on frequency of problem occurrence during the usage sessions. Reliability metrics may be calculated from the information. Failure data additionally collected during the usage sessions may be accessed to derive details that correspond to the potential problems. In one example, the information may be analyzed to determine which alerts and/or asserts occurred most often, and/or to determine a relationship between user interface control operations (e.g., clicks and usage of commands) and alerts or asserts.

20 Claims, 6 Drawing Sheets

SOFTWARE RELIABILITY ANALYSIS USING ALERTS, ASSERTS AND USER INTERFACE CONTROLS

CROSS-REFERENCE TO RELATED APPLICATIONS

The present application is related to the following copending U.S. patent applications, assigned to the assignee of the present application, filed concurrently herewith and hereby incorporated by reference:

Analyzing Software Users with Instrumentation Data and User Group Modeling and Analysis, U.S. patent application Ser. No. 11/818,610;

Multidimensional Analysis Tool for High Dimensional Data, U.S. patent application Ser. No. 11/818,607;

Efficient Data Infrastructure for High Dimensional Analysis, U.S. patent application Ser. No. 11/818,879;

Software Feature Usage Analysis and Reporting, U.S. patent application Ser. No. 11/818,600;

Software Feature Modeling and Recognition in Real World Usage Data, U.S. patent application Ser. No. 11/818,596; and Analyzing Software Usage with Instrumentation Data, U.S. patent application Ser. No. 11/818,611.

BACKGROUND

Understanding the cause of a software failure can lead to improved software product reliability. In the past, improving the reliability of software products in part was done by analyzing failure data (sometimes referred to as a crash dump) that a computer system collects with respect to a program failure, e.g., when the program exits unexpectedly or freezes and has to been manually terminated in an external, atypical way.

In an operating system such as Microsoft® Windows®, the failure data may be categorized to an extent by product, referred to as "Watson" buckets (after the DrWatson mechanism (e.g., application, logs and dump files) used for collecting crash dump data. The Watson buckets contain the details about user actions, program state and the like that may have led to the crash, including alerts and asserts (exception error messages). A typical approach for product teams is to fix a certain percentage of the bugs corresponding to their Watson buckets before product release.

However, such a straightforward approach does not always lead to improvement in product reliability. For example, a bug that relatively frequently occurs may be fixed with this approach, while a bug that occurs rarely may not be addressed. In general, this approach does not provide the flexibility to better understand the overall reliability picture of a software product.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which information corresponding to a set of software instrumentation data collected during software program usage sessions is analyzed to identify potential problems with software program usage, based on frequency of problem occurrence during the usage sessions. Failure data additionally collected during the usage sessions may be accessed to derive details that correspond to the potential problems. Filtering based on usage criteria may be used to limit the analysis to only those sessions that meet the usage criteria.

In one example, the information may be analyzed to determine which alerts and/or asserts occurred most often, and/or to determine a relationship between user interface control operations and alerts or asserts. Failure data for those alerts and/or asserts may be accessed to provide additional details.

Reliability metrics may be calculated from the information. Examples of reliability metrics may include crash information corresponding to a number of sessions of a user that crashed, failure information corresponding to a number of sessions that failed of a user, mean time to crash information corresponding to session length and sessions of a user that crashed, mean time to failure information corresponding to session length and number of sessions of a user that failed, mean commands to crash information, and/or mean commands to failure information.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards analyzing software usage data in conjunction with failure (crash dump) data, such as for the purpose of improving the reliability of software products. To this end as described below, various aspects are directed towards collecting and analyzing various application-related usage data, referred to as instrumentation data, in an attempt to obtain an overall picture of application program usage, particularly with respect to program failure.

To this end, example analyses are described herein that present a more complete reliability picture, including by measuring various quantifiable metrics. The analyses are flexible enough to allow different views of the collected data. In general, the example analyses correlate failure data and instrumentation data (also referred to as software quality metrics, or SQM data).

For purposes of understanding the description, the technology is described herein by use of such examples, including those that operate in various environments, such as internal users (e.g., corresponding to employees of the enterprise that is analyzing the software) and external (non-employee) users. Further, the programs exemplified herein are generally a suite of application programs such as those provided as part of the Microsoft® Office software product suite, and failure data such as that provided by the DrWatson mechanism (DrWatson data). However, as will be understood, these are only non-limiting examples, and the technology is applicable to different environments and different software products, including individual application programs and operating system components, as well as different failure data collection mechanisms and corresponding failure data.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
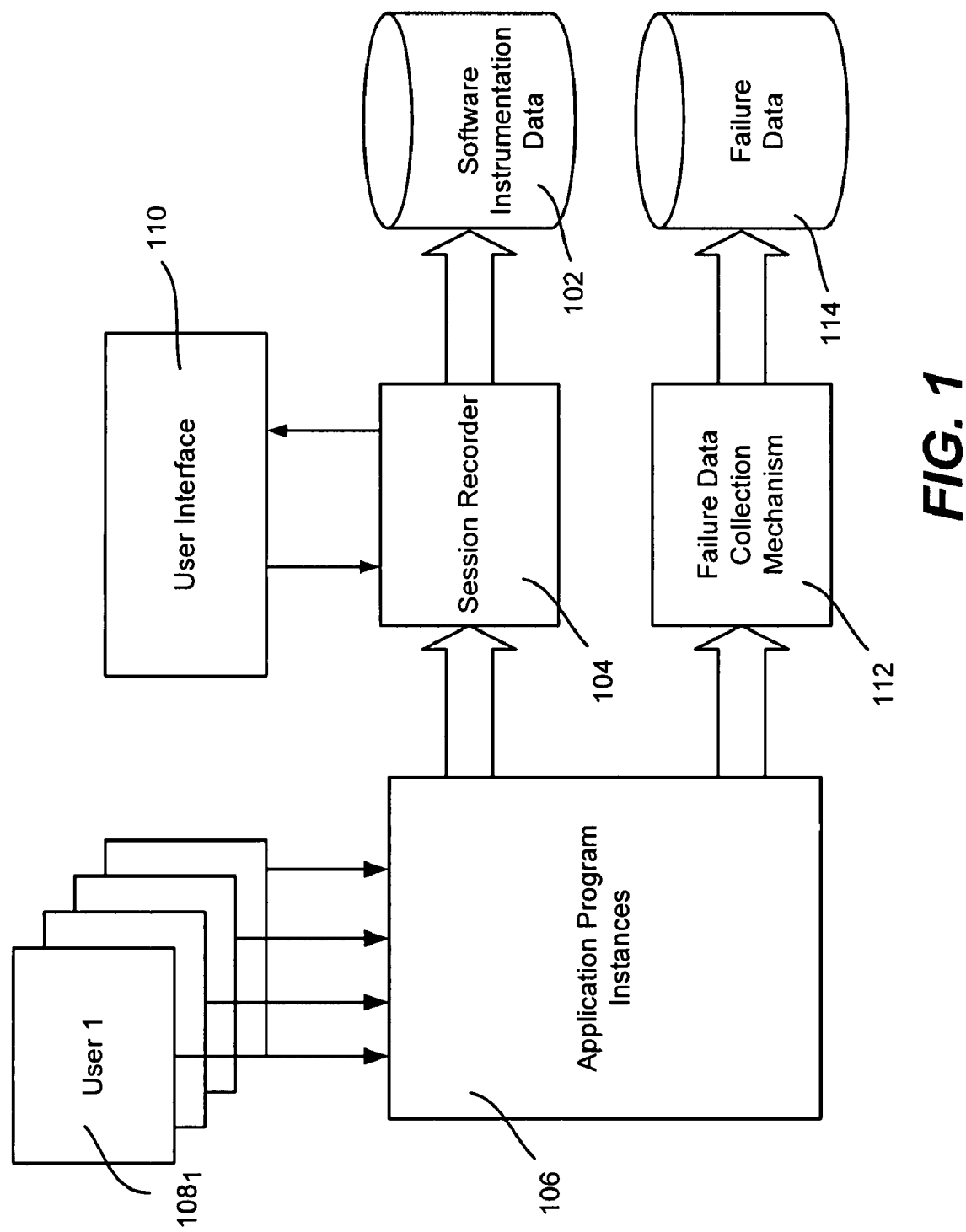
FIG. 1 shows a representation of an example mechanism for collecting software instrumentation data for subsequent analysis.

Turning to FIG. 1, there is shown a mechanism for collecting software instrumentation data 102, including a session recorder 104 that collects various data from one or more application instances 106 corresponding to various users $108_1$-$108_n$, where n represents any practical number of users. The session recorder 104 may be per application instance/user, or may be a mechanism such as an agent on each computing device of a network that communicates with at least one data collection server component running on a network server or the like.

A user interface 110 allows an operator or the like to set collection parameters such as from which program to collect the instrumentation data, which users to analyze, how long a collection session should last (if the program is not ended by the user within that time limit) and so forth. Also represented in FIG. 1 is the failure data collection mechanism 112 that collects the failure data 114, which, for example, corresponds to the DrWatson mechanism and DrWatson data files that are already present in computer systems running a contemporary version of the Microsoft® Windows® operating system.

In general, the instrumentation data 102 comprise data collected from each user session, where a session corresponds to actual usage by a user of an executing program. A session starts from the application start (e.g., by double clicking on the application executable or a document that launches the application executable, or by choosing the application from a start menu), and ends when the application is closed (e.g., by choosing "Exit" in the application or closing the application window). As is relative to debugging via failure data, sessions can also end by abnormal termination of a program, e.g., because of program or system crashes. Sessions can also be time limited, e.g., if a session exceeds twenty-four hours, the session is ended and the instrumentation data recorded (the application continues to run).

Figure 2:
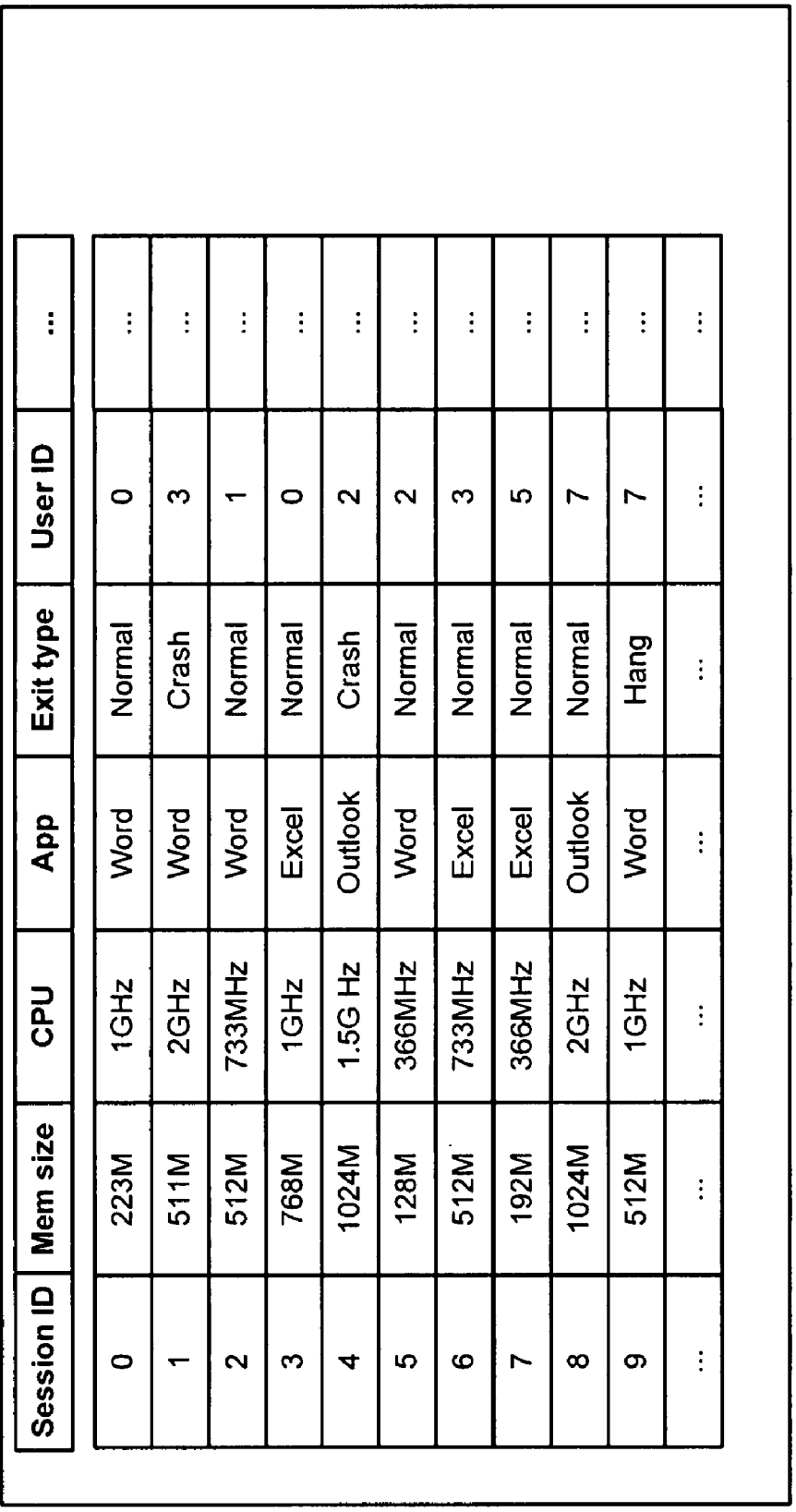
FIG. 2 shows an example representation of software instrumentation data, in the form of software quality metrics (or SQM) data collected for user sessions corresponding to actual usages during program execution.

FIG. 2 provides an example of instrumentation data 102, with some of the data (arranged in columns) collected for some number of sessions (arranged in rows). In one example implementation, each session is associated with some or all of the information shown in FIG. 2, including a session ID, a user ID, an application (or other program) name and the way in which the program terminated (exit type). Other information that is typically recorded includes the application version, a start time, an end time, the commands used during the session and still other data, such as the number of files opened and so forth. Note that in actual implementations, the instrumentation data 102 may be many thousands of dimensions.

As described below, various example analyses are provided that connects software instrumentation data (e.g., SQM data) with failure data (e.g., DrWatson data). In general, the software instrumentation data is accessed to find the high frequency issues, and once those issues are identified, the corresponding failure data is accessed to derive the details about those issues. The correlation between these two types of database provides a more thorough reliability picture, Although reliability has been calculated from aggregated instrumentation data, it has heretofore not been calculated by using raw instrumentation data (or otherwise reformatted instrumentation data) to calculate reliability metrics. Further, the reliability analyses facilitate configuration of parameters such as user group, application, and a program version for calculation of the various reliability metrics.

The industry standard for reliability has, for some time, been Mean Time to Failure (MTTF). However, while a valuable metric, MTTF is only one metric, and in many analyses situations is likely not the best metric. To this end, there is herein provided an example set of metrics that more thoroughly covers various aspects of reliability; note that these metrics are just examples, and any suitable usage data may be used to define various aspects of reliability. As set forth below, such example metrics may include crash ratio, failure ratio, Mean Time to Crash (MTTC), Mean Time to Failure (MTTF), Mean Commands to Crash (MCTC), and Mean Commands to Failure (MCTF); various analyses may use these metrics for different ways of examining and interpreting software instrumentation data:

| | |
|---|---|
| Crash Ratio | Crash Ratio = number of sessions exiting in a crash/total Number of sessions |
| Failure Ratio | Failure Ratio = number of sessions exiting in an abnormal way/total number of sessions |
| Mean Time to Crash (MTTC) | MTTC = total time an application runs/number of sessions exiting in a crash |
| Mean Time to Failure (MTTF): | MTTF = total time an application runs/number of sessions exiting in an abnormal way |
| Mean Commands to Crash (MCTC): | MCTC = total number of commands executed by an application/number of sessions exiting in a crash |
| Mean Commands to Failure (MCTF) | MCTF = total number of commands executed by an application/number of sessions exiting in an abnormal way |

Figure 3:
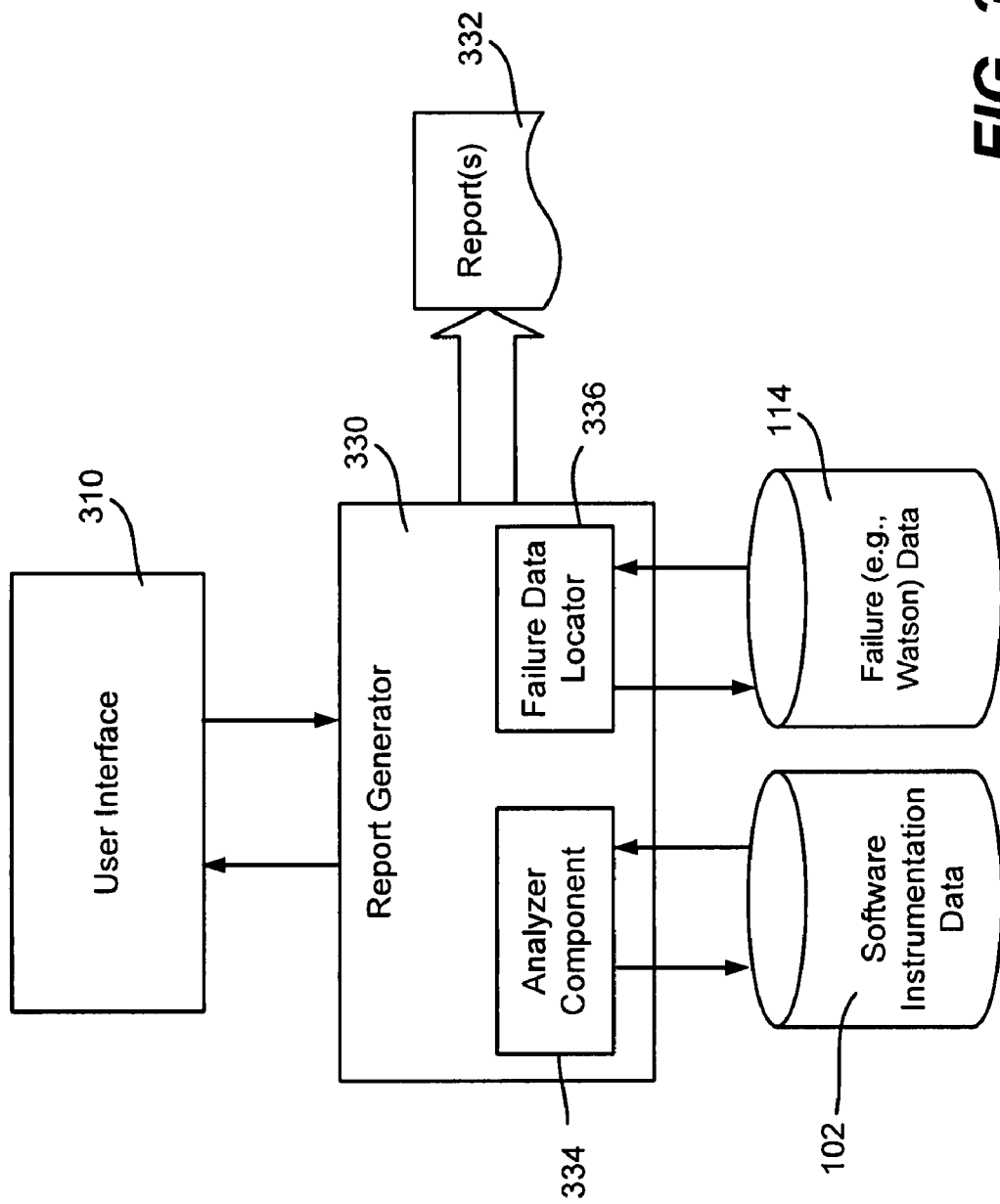
FIG. 3 shows a representation of an example mechanism for analyzing software instrumentation data and failure data to generate a software reliability analysis report.

FIG. 3 represents aspects related to such analyses, and includes a user interface 310 for defining an analysis or set of analyses and obtaining the results. In general and as described below, a report generator 330 that generates reliability reports 332 and the like includes an analyzer component 334 that generates one or more queries against the instrumentation data 102 and processes the returned results as necessary (e.g., as described below) to satisfy the requested type of analysis. Note that the data may be first pre-processed into any suitable data structure or set of data structures, such as described in the aforementioned U.S. Patent Applications entitled "Multidimensional Analysis Tool for High Dimensional Data" and "Efficient Data Infrastructure for High Dimensional Data Analysis." Further, the data may be accessed via a client/service architecture, such as described in the aforementioned U.S. patent application entitled "Analyzing Software Usage with Instrumentation Data," in which a data explorer system manages the data for the analysis and provides access to the data via APIs.

Also represented in FIG. 3 is a locator component 336 that retrieves selected failure information from the failure data 114 that corresponds to the analysis. By way of example, two types of analyses identify "Alerts" and "Asserts" (recorded as part of the SQM data) respectively, and in particular those that occur most often in abnormal sessions (e.g., sessions that terminate with either a crash, a hang, or by another abnormal means such as a power failure). Once the analyzer component 334 provides the Alerts and Asserts, the locator component 336 looks up details on those Alerts and Asserts by accessing the corresponding failure (e.g., Watson) data.

Figure 4:
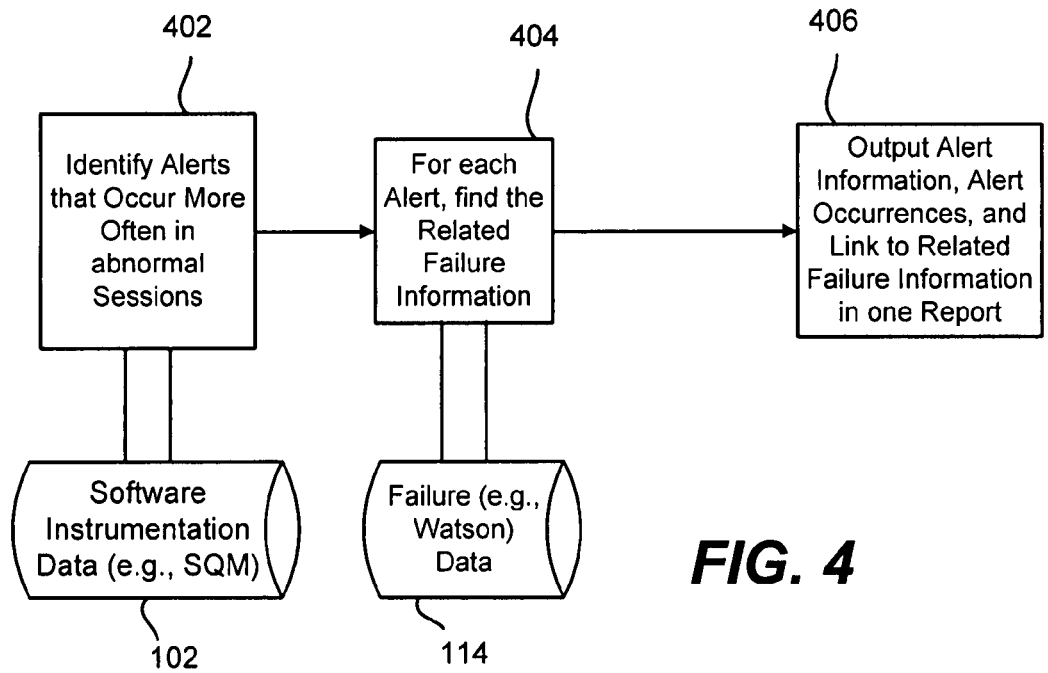
FIG. 4 shows an example representation of processing software instrumentation data and failure data with respect to outputting alert-related information.
Figure 5:
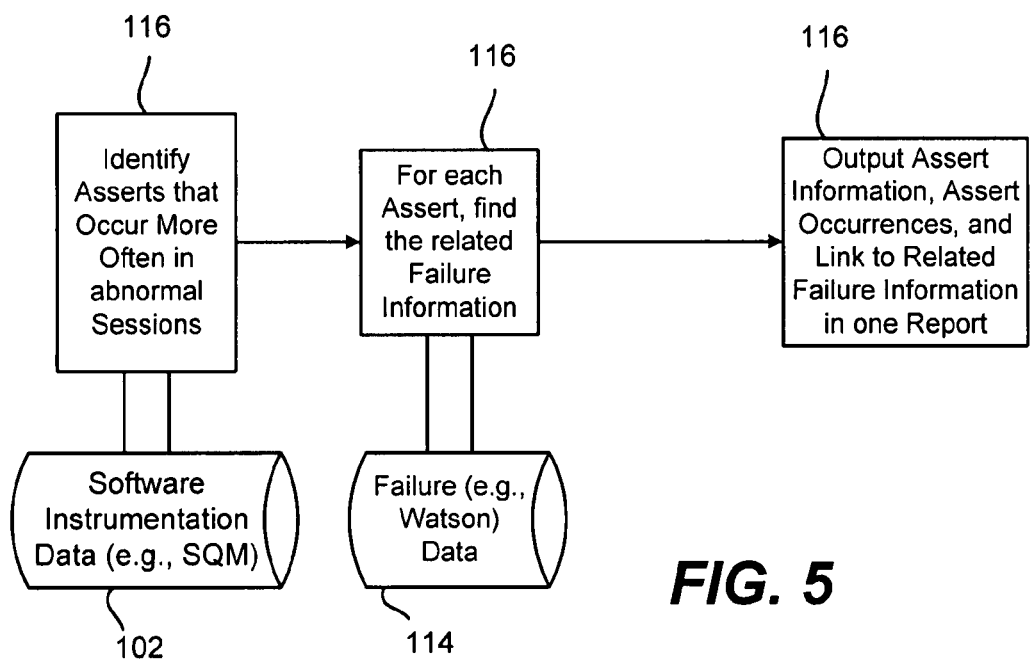
FIG. 5 shows an example representation of processing software instrumentation data and failure data with respect to outputting assert-related information.

FIGS. 4 and 5 represent an example process for generating reports for "Alerts" and "Asserts," respectively. Note that Alerts and Asserts are only example events corresponding to reliability indicators within usage data; any reliability indicators within the usage data are equivalent, with additional details about the reliability indicators obtained via the failure data. In FIG. 4, step 402 represents accessing the software instrumentation data 102 to identify which alerts occur more often in abnormal sessions. For example, a query can be submitted against the data to find the set of alerts corresponding to abnormal sessions, and those alerts may be sorted by frequency of type of alert.

Step 404 represents accessing the failure data 114 for the most frequent alerts, with step 406 representing the outputting of the report, such as including the alert information, alert occurrences, and one more links to the related failure information. Note that the report data may be displayed to a user/operator, such as for the purpose of debugging the corresponding software program, and/or may also be used at least in part by an automated debugging tool.

Steps 502, 504 and 506 of FIG. 5 are similar to steps 402, 404 and 406 of FIG. 4, respectively, although they relate to Asserts (generally related to exception error messages) rather than Alerts. As such, a description of these steps is similar to the description of FIG. 4, and is not repeated for purposes of brevity.

Figure 6:
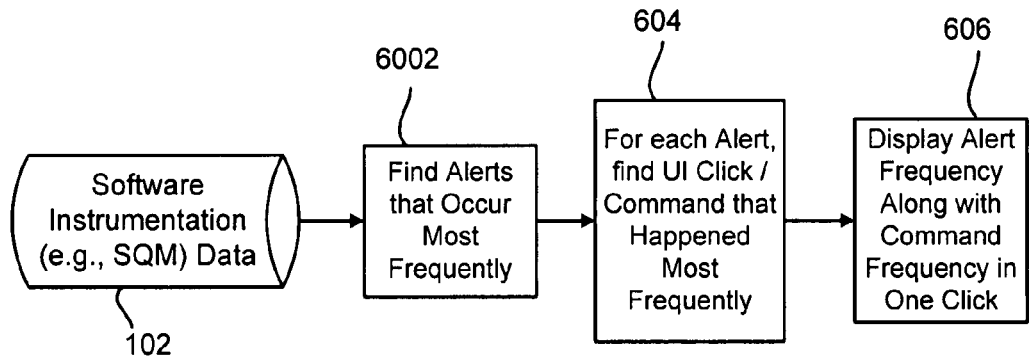
FIG. 6 shows an example representation of processing software instrumentation data and failure data with respect to outputting information relative to relationships between user program interaction and resultant alerts (or asserts).

Another example analysis is represented in FIG. 6, and is directed towards showing a list of user interface (UI) control clicks that cause reliability degradation. For a UI control, one analysis shows the number of times that control was used in conjunction with the number of times that control usage was followed by an Alert (or similarly by an Assert, although Asserts are not explicitly shown in FIG. 6). In one example, using the SQM data, the analyzer component 334 finds the most frequent Alerts and Asserts. For each Alert and Assert, the analyzer component 334 finds the list of commands that immediately precede the Alert. For a final output, the analyzer component 334 generates a list of frequently occurring Alert/Asserts, and for each Alert/Assert, the analyzer component 334 shows the frequency distribution of preceding commands.

To this end, as represented in FIG. 6, step 602 represents accessing the software instrumentation data 102 to identify which Alerts (or alternatively which Asserts) have occurred more often than others in abnormal sessions. For example, a query can be submitted against the data to find the set of alerts corresponding to abnormal sessions, and those alerts may be sorted by frequency of type of alert. Step 604 represents accessing the instrumentation data 102 to find which immediately preceding UI click/command happened most frequently, (for each alert or for only the most frequent alerts). Step 606 represents the outputting of the report, such as showing the most frequent Alerts (or Asserts) in conjunction with the command frequency for each.

The analyzer component 334 also may perform an analysis that shows which users are having the most problems with the product or products being evaluated. In such a "most-troubled users" analysis, the analyzer component 334 identifies the users who are facing the most problems with a particular application. To this end, the analyzer component 334 can use any of the reliability metric or metrics, including crash ratio, failure ratio, MTTC, MTTF, MCTC and/or MCTF to sort the users. For any class of users (e.g., internal) users, the analyzer component 334 also may show the related failure information. Note that "most-troubled users" is only one example; this concept may be extended to cover other kinds of units such as "most troubled machines", "most troubled user groups," "most troubled websites," and so forth.

Figure 7:
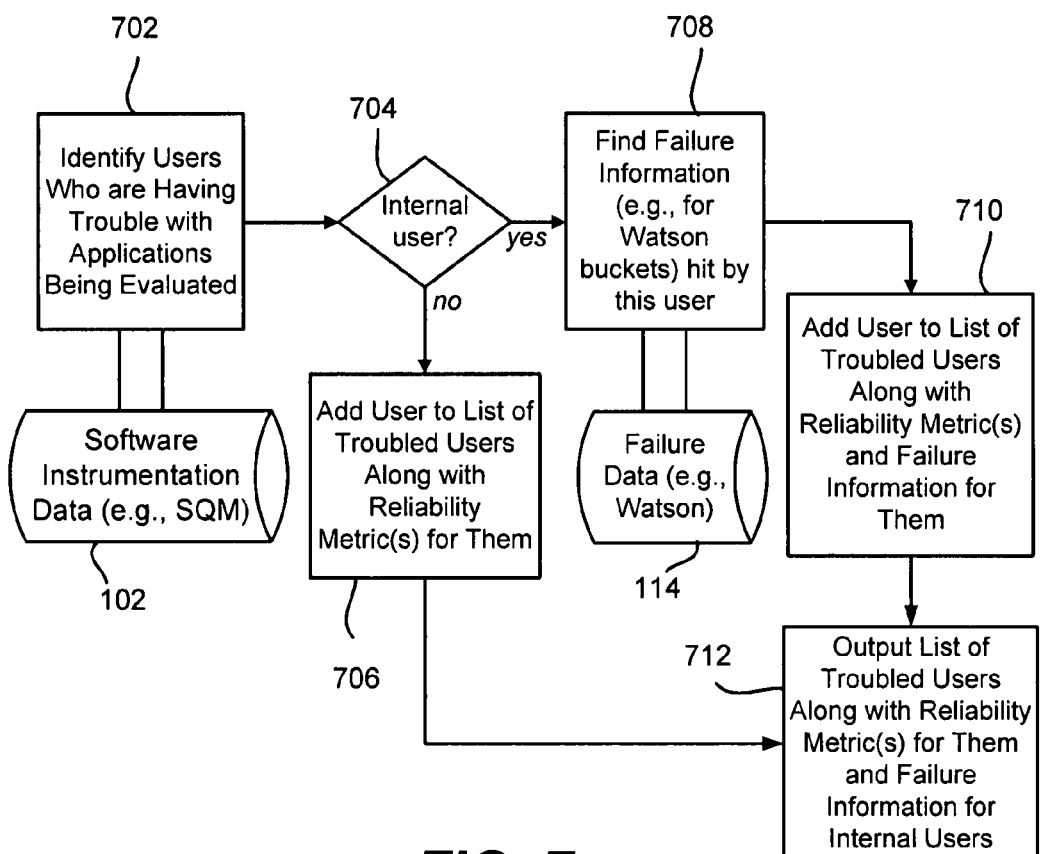
FIG. 7 shows an example representation of processing software instrumentation data and failure data with respect to outputting information related to users who are having trouble with one or more application programs being evaluated.

For example, as represented in FIG. 7, the analyzer component 334 may use the per-user SQM information to calculate crash ratio, failure ratio, MTTC, MTTF, MCTC, and/or MCTF for each user. For example, the analyses can be modified easily to show the X number of users having the worst crash ratio, (or the X number of users with respect to any of the other metrics). For internal users, (or another class such as external users whose companies agree to participate), the analyzer component 334 can further find and output the corresponding failure (e.g., Watson) information logged for that user.

FIG. 7 summarizes such a user-related analysis, beginning at step 702 which represents accessing the instrumentation data 102 to identify some set of users who are having trouble with one or more of the applications being evaluated. Step 704 differentiates between classes of users, e.g., internal users who will have failure data included in the output report, and external users who will not. For external users, the user and reliability metrics data is added to a list or the like via step 706. For internal users, the failure information is retrieved at step 708, and at step 710 included in the output report for the user in conjunction with the reliability metrics for that user. Step 712 represents outputting the report for multiple users, e.g., after processing the set of users as described with reference to steps 704, 706, 708 and 710.

The analyzer component 334 may also use per-user SQM information to create a distribution mapping for each reliability metric. For each user, the analyzer component 334 calculates any or all of the different reliability metrics using the SQM data. For each of the metrics, the user base may be classified into categories (buckets) based on the calculated values. The report creator can customize the number of each to use in the distribution. For example, one analysis can categorizes the program users into one group of a set of groups according to each of their crash ratios.

Additional example analyses may be performed using the instrumentation data 102, which may be linked to the failure data 114. For example, the analyzer component 334 also may provide an analysis that determines the frequency of consecutive failures for an application. In a consecutive failure analysis, the analyzer component 334 may use the SQM data to find the users who had consecutive failure sessions, whereby the analyzer component 334 can display the number of users, broken down by the number of consecutive failure sessions. This gives yet another measure of reliability.

As another example, the analyzer component 334 also may provide an analysis that shows which applications were running concurrently, and the effect of concurrency on application failures. In the concurrency and reliability analysis, the analyzer component 334 determines whether the reliability of an application is affected by other applications running concurrently. For this analysis, the analyzer component 334 finds a list applications running concurrently with the specified application. The analyzer component 334 then determines the reliability metrics for the specified applications based on the sessions that run concurrently with the other applications. In the report, the analyzer component 334 outputs a comparison of reliability metrics with concurrency and without concurrency.

Exemplary Operating Environment

Figure 8:
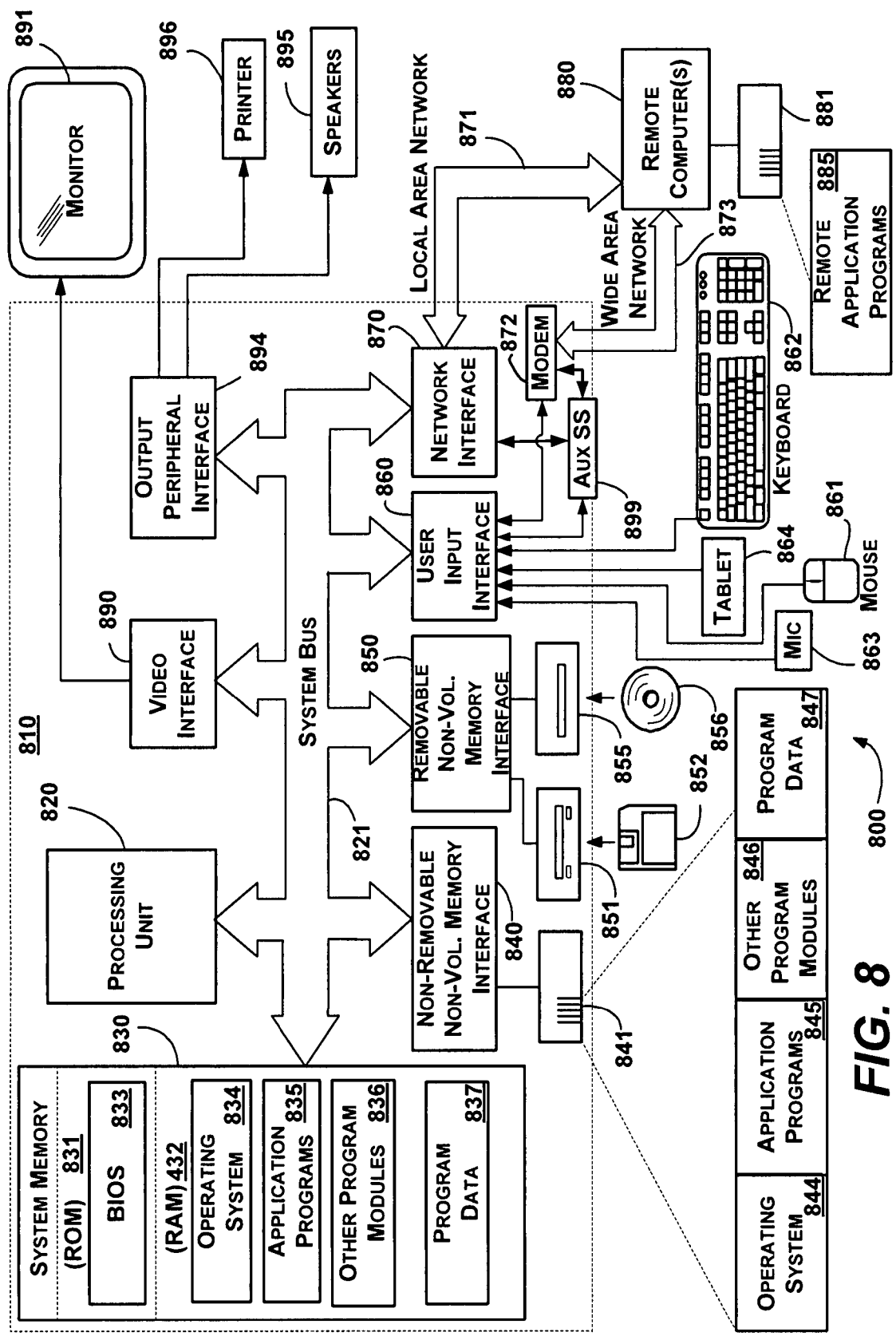
FIG. 8 is an illustrative example of a general-purpose computing environment into which various aspects of the present invention may be incorporated.

FIG. 8 illustrates an example of a suitable computing system environment 800 on which the data collection and/or failure analysis mechanisms may be implemented, at least in part. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed by a computer, the method comprising:

analyzing a set of software instrumentation data collected and stored by software instrumentation during software program usage sessions to identify potential problems with at least one software program corresponding to the software instrumentation data, wherein a usage session comprises a session of use of the software program by a user, wherein the potential problems are identified based on frequency of occurrence of asserts during the usage sessions, wherein the software instrumentation data is collected at least in part by executing the asserts in the program, where each assert comprises a statement including a logical condition that is evaluated when the assert is executed, wherein when the logical condition evaluates to true the assert statement has no effect on the program and when the assert statement evaluates to false corresponding indicia is recorded in the software instrumentation data; and accessing failure data additionally collected during the usage sessions, the failure data having been collected by a crash handling system separate from the software instrumentation, the failure data comprising one or more crash dumps captured by the crash handling system when the software program crashed, and locating, within the failure data, portions thereof that correspond to the identified potential problems, and obtaining details of the potential problems from the portions of failure data that correspond to the potential problems.

2. The method of claim 1 wherein analyzing the software instrumentation data includes filtering the software instrumentation data to locate a subset of session data corresponding to only program sessions that terminated abnormally.

3. The method of claim 2 wherein analyzing the information further comprises processing the subset to determine which alerts or asserts, or both alerts and asserts, occurred most often within that subset of sessions.

4. The method of claim 2 wherein the analyzing further comprises calculating reliability metrics from the software instrumentation data.

5. The method of claim 4 wherein calculating the reliability metrics comprises computing at least one of: crash information corresponding to a number of sessions of a user that crashed, failure information corresponding to a number of sessions that failed of a user, mean time to crash information corresponding to session length and sessions of a user that crashed, mean time to failure information corresponding to session length and number of sessions of a user that failed, mean commands to crash information, or mean commands to failure information, or any combination of crash information, failure information, mean time to crash information, mean commands to crash information, or mean commands to failure information.

6. The method of claim 5 further comprising, outputting a distribution mapping for at least one calculated reliability metric.

7. The method of claim 1 further comprising, determining the frequency of consecutive failures for a software product.

8. The method of claim 1 further comprising, determining which computer programs including at least one application of a selected software product were running concurrently with the software program when a problem occurred with the software program.

9. The method of claim 1 wherein analyzing the information comprises determining a relationship between user interactions with a interface control and indicia of alerts or asserts in the software instrumentation data.

10. The method of claim 1 wherein the analyzing comprises performing an analysis on a selected group of users, or a selected program version, or a combination of a selected group of users and a selected program version.

11. A computer-readable medium having computer executable instructions, which when executed by a computer cause the computer to perform steps comprising:

using recorded session data stored by the computer to form a set of users determined to be having problems with a software product the session data comprising execution traces generated and recorded by the software product while the software product was being operated by the users, and determining from the recorded session data one or more reliability metrics comprising at least one of: crash information corresponding to a number of sessions of a user that crashed, failure information corresponding to a number of sessions that failed of a user, mean time to crash information corresponding to session length and sessions of a user that crashed, mean time to failure information corresponding to session length and number of sessions of a user that failed, mean commands to crash information, or mean commands to failure information, or any combination of crash information, failure information, mean time to crash information, mean commands to crash information, or mean commands to failure information, and For the set of users, determining, using a crash handling system separate from the trace generating system, whether each user belongs to a class of users for which failure data was recorded, and if so, accessing the failure data to derive details from the failure data that correspond to the recorded session data for that user, the failure data comprising crash dumps of the software product.

12. The computer-readable medium of claim 11 having further computer-executable instructions comprising, outputting information corresponding to a subset of users based on their problems with the software product.

13. The computer-readable medium of claim 11 having further computer executable instructions comprising, filtering the recorded session data to locate the set of users based on filtering criterion or criteria corresponding to at least one parameter in the recorded session data.

14. The computer-readable medium of claim 11 having further computer executable instructions comprising, outputting a distribution mapping for each determined reliability metric.

15. The computer-readable medium of claim 11 having further computer-executable instructions comprising, determining the frequency of consecutive failures for the software product.

16. The computer-readable medium of claim 11 having further computer executable instructions comprising, determining which computer programs including at least one application of the software product were running concurrently when a problem occurred.

17. A computer comprising:

an analyzer that processes software instrumentation trace data recorded from user software program usage sessions to determine which alerts or asserts, or both alerts and asserts, occurred during sessions of a user using the software program, the asserts and alerts comprising statements of the software program, the software instrumentation trace data having been captured by software instrumentation facilities on the computer, the software instrumentation facilities being available for any arbitrary software program to use to trace execution thereof;

a locator component that accesses failure data for at least one alert or assert determined by the analyzer, the failure data comprising or derived from one or more crash dumps of the software program, the locator component obtaining from the failure data failure information that corresponds to a trace or alert determined by the analyzer; and a storage component storing results corresponding to alert or assert, or alert and assert occurrences, and any located failure data for each alert or assert.

18. The computer of claim 17 wherein the analyzer processes the software instrumentation trace data to determine a relationship between user interface operations and alerts.

19. The computer of claim 17 wherein the analyzer processes the information to determine a relationship between user interface operations and asserts.

20. The computer of claim 17 wherein the computer filters the software instrumentation trace data based on one or more session criteria or user criteria, or both session criteria and user criteria, to determine which alerts or asserts, or both alerts and asserts occurred during only those sessions that meet the criteria.

* * * * *